United States Patent
Hudson

[11] 3,912,362
[45] Oct. 14, 1975

[54] TERMINATION FOR FIBER OPTIC BUNDLE

[75] Inventor: Marshall C. Hudson, Corning, N.Y.

[73] Assignee: Corning Glass Works, Corning, N.Y.

[22] Filed: Dec. 26, 1973

[21] Appl. No.: 427,983

[52] U.S. Cl. .............................. 350/96 B; 350/96 C
[51] Int. Cl.² ............................................ G02B 5/16
[58] Field of Search .......... 350/96 B, 96 R, 96 WG, 350/96 C

[56] References Cited
UNITED STATES PATENTS

| | | | |
|---|---|---|---|
| 2,979,632 | 4/1961 | MacNeille | 350/96 B X |
| 3,240,106 | 3/1966 | Hicks | 350/96 B X |
| 3,469,026 | 9/1969 | Winik et al. | 350/96 B X |
| 3,563,716 | 2/1971 | Li | 350/96 B X |
| 3,572,891 | 3/1971 | Longenecker | 350/96 C |
| 3,669,772 | 6/1972 | Strack | 350/96 B X |

OTHER PUBLICATIONS

Parfitt et al., Article in *Electronic Components*, Jan. 28, 1972, pp. 69 and 73–75 cited.

*Primary Examiner*—David H. Rubin
*Attorney, Agent, or Firm*—William J. Simmons, Jr.; Walter S. Zebrowski; Clarence R. Patty, Jr.

[57] ABSTRACT

Cladding is etched from the end portions of the fibers which form a fiber optic bundle, and the etched end portions are supported to form a bundle termination having reduced cross-sectional area and increased packing fraction since the ratio of the fiber core area to the bundle area increases. The light emission and collection efficiency of the bundle termination therefore increases.

14 Claims, 9 Drawing Figures

_1_

TERMINATION FOR FIBER OPTIC BUNDLE

BACKGROUND OF THE INVENTION

The continually increasing amount of traffic that communication systems are required to handle has hastened the development of high capacity optical communication systems that operate around $10^{15}$ Hz. Since conventional electrically conductive waveguides, which have been employed at frequencies between $10^9$ Hz and $10^{12}$ Hz, are not satisfactory for transmitting information at carrier frequencies around $10^{15}$ Hz, low loss optical waveguides or bundles thereof must be utilized at these frequencies. To effectively utilize low loss optical waveguide bundles for communication purposes, means is required for coupling light to and from a bundle and from one bundle to another with little loss of signal, i.e., with low insertion loss. One cause of insertion loss is referred to as packing fraction loss since it is related to the packing fraction of the fiber bundles, i.e., the ratio of the area of the fiber cores to the area of the entire bundle endface. For example, only about 33% of the light uniformly illuminating the end of a bundle falls on fiber core areas, assuming the fibers are stacked in a close packed array and are circular fibers having an overall diameter of 5 mils and a cladding thickness of 1 mil. If the end of such a bundle is illuminated by light from another bundle, the amount of light coupled to the receiving bundle is even less, since the packing fraction of both bundles must be taken into consideration where the two bundles are joined at a random orientation. If no attempt is made to reduce packing fraction losses, as little as 15% of the light propagating in one bundle is transmitted to the other. Thus, for the aforementioned random butt joint between two fiber bundles of the heretofore described 5 mil optical waveguide fibers, there can be an 8 dB insertion loss. Losses of this magnitude cannot be tolerated in optical communication systems, especially in view of the fact that waveguide attenuation is as low as about 4 dB/km.

SUMMARY OF THE INVENTION

It is therefore an object of the present invention to provide a fiber optic bundle termination having an increased packing fraction, thereby permitting an increased density of optical energy propagating to or from the termination endface.

The present invention relates to an improvement in optical communication systems of the type comprising a plurality of optical fibers disposed in side-by-side relationship, each of the fibers including a relatively long light transmitting portion and at least one relatively short end portion. Each of the fibers includes a core of transparent material surrounded by a layer of transparent cladding material having a refractive index less than that of the core material. Means is disposed at an end of the fibers for retaining the end portions thereof. In accordance with the present invention, the cladding thickness of the end portion of each of the fibers is less than that of the cladding thickness of the light transmitting portion thereof, the core diameters of the fibers remaining substantially unchanged.

DESCRIPTION OF THE PREFERRED EMBODIMENTS

The desirability of increasing the packing fraction of optical waveguide bundle terminations has been previously mentioned. However, the present invention may also be advantageously employed to increase the packing fraction of bundles of conventional optical fibers as well as optical waveguide fibers, and all such fibers will be hereinafter referred to as optical fibers. The present invention is particularly applicable to bundles of optical waveguide fibers because of the need to minimize insertion losses in optical communication systems employing such fibers and because optical waveguide bundles often have very small packing fractions due to the relatively large cladding thicknesses thereof.

Figure 1:
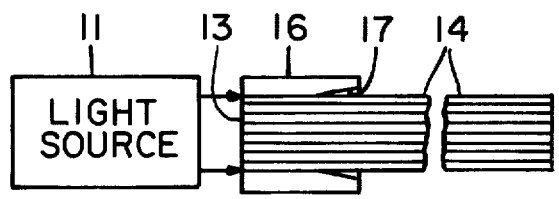
FIG. 1 is a schematic illustration of a prior art fiber bundle termination.

An optical fiber usually consists of a core of transparent material having a layer of transparent cladding material disposed on the surface thereof, the refractive index of the cladding material being less than that of the core. Optical fibers are often grouped into bundles of fibers each of which propagates the same optical signal in order to provide redundancy in the event that some of the fibers break and also to enable the propagation of more energy than that which could be propagated by a single fiber. The ends of such fiber bundles may be disposed in a termination ferrule which supports the fibers so that the endfaces thereof are properly positioned with respect to a light source, a photodetector, another fiber bundle or the like. In FIG. 1, which is intended to be exemplary of fiber optic bundle terminations, a light source 11 directs a beam of light on endface 13 of a fiber optic bundle 14, which comprises a plurality of fibers, each having a relatively long light transmitting portion and at least one end portion which is disposed in a termination ferrule 16. The length of the light transmitting portion may be from several meters to several kilometers while the termination ferrule is usually only a few centimeters in length or less. A bundle termination can be made by crimping a ferrule onto the end portion of a fiber bundle or by inserting the end of a bundle into the ferrule aperture. The fibers may be bonded to the ferrule and to each other by a suitable adhesive. Some adhesives have lubricating properties while they remain in the uncured state and can be applied to the end of the bundle prior to insertion thereof into the ferrule aperture to facilitate the insertion process. Insertion of the bundle into the ferrule can be further facilitated by providing the ferrule with a tapered aperture 17. The ferrule is usually made of a material such as brass, aluminum, glass or the like since it is ground along with the fiber endfaces to provide optical quality endfaces that lie in a single plane. It is noted that the fibers of this prior art bundle termination have a constant diameter throughout their lengths.

Figure 2:
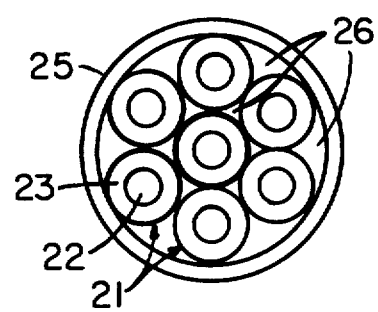
FIG. 2 is an end view of a typical bundle termination.

An end view of a typical bundle termination is shown in FIG. 2, wherein the end portions of a plurality of fibers 21 each consisting of a core 22 and a cladding layer 23, are disposed in ferrule 25. Fibers 21 are arranged in a close packed array whereby the centers of the ends of any three contiguous fibers of a bundle are disposed at the vertices of an equilateral triangle. A close packed array permits a bundle of fibers to occupy the least possible cross-sectional area and is therefore a preferred fiber geometry for bundle terminations. The packing fraction $\phi$ of a bundle termination of the type illustrated in FIG. 2 is generally taken to be $$\phi = \pi \left(1 - \frac{2t}{D}\right)^2 / 2\sqrt{3} \qquad (1)$$

where $t$ is the cladding thickness and $D$ is the total diameter of the fiber. When the endface of a bundle of fibers such as that illustrated in FIG. 1 is to be illuminated as shown in FIG. 1, only a fraction of the endface is available for collecting light, namely the area presented by the fiber cores 22. It can be seen that the sum of the areas presented by cladding layers 23 and also the spaces 26 between adjacent fibers and between the outer fibers and the ferrule do not contribute to the light gathering area of the endface.

In accordance with the present invention some or all of the cladding layer is removed from the end portions of the optical fibers of a bundle. Since the cladding thickness $t$ of equation (1) decreases, the packing fraction increases, thereby minimizing insertion losses at the bundle endface. To prevent unnecessary losses the length of these end portions should be kept relatively short, i.e., about the length of the terminating ferrule.

The cladding thickness may be reduced by immersing the end portions of the fibers in a liquid which chemically attacks or dissolves the cladding material until the cladding layers are either completely removed or are reduced in thickness to such an extent that the packing fraction is increased to a predetermined value. The liquid employed to decrease the cladding thickness depends upon the cladding material, which consists of a transparent material such as glass, plastic or the like. The cladding of plastic fibers, for example, can be dissolved by immersion in a solvent. Some glasses are chemically attacked by an acid such as hydrofluoric acid, phosphoric acid or the like whereas some glasses are chemically attacked by an alkaline solution such as sodium hydroxide, potassium hydroxide or the like. Since etch rate is a function of concentration or strength of the chemical solution as well as the temperature thereof, the amount of cladding to be removed is determined by controlling the solution concentration and temperature and the time during which the fiber end portions are immersed in the solution. A discussion of various etching solutions or reagents, and their effect on various types of glasses appears in Chapter 3 "Glass Engineering Handbook" by E. B. Shand, Second Edition, McGraw-Hill Book Company, Inc., 1958.

Conventionally handled fiber bundles can be etched without any precleaning of the fibers. If the fibers become contaminated with grease or any other material which would prevent uniform etching, such contamination should be removed prior to etching. Suitable fiber cleaning solutions include commercially available detergents, methanol, trichlorethylene, and the like.

If the end of a conventional bundle of optical fibers is merely immersed in the etching solution, adjacent fibers are so closely situated that reaction products are not readily removed from the vicinity of the cladding surfaces, the concentration of the etching solution at the cladding surfaces thereby decreases, and all of the fibers of a bundle are not etched at a uniform rate. This problem has been overcome by causing agitation of the etching solution by such methods as stirring the etching solution, ultrasonically agitating the etching solution and vibrating the fiber bundle.

The following specific example illustrates a method of forming a bundle termination by etching glass optical waveguide fibers in an ultrasonically agitated bath. A bundle of 60 optical waveguide fibers was prepared, each fiber consisting of a 3.6 mil diameter core of fused silica doped with germania and a cladding layer of pure fused silica. The overall fiber diameter was 5.4 mils. The end of the bundle was immersed for 13 minutes in an etch bath of ultrasonically agitated 48% hydrofluoric acid at 25°C. After being removed from the etch bath, the fibers were rinsed in ultrasonically agitated water, rinsed in ultrasonically agitated methanol and thereafter dried on a hot plate. The etched fibers were thereafter potted in a glass ferrule by an epoxy adhesive. The ends of the ferrule and fibers were then polished with No. 600 silicon carbide wet grinding paper. The aforementioned etching process reduced the overall fiber diameter to about 3.8 mils. Using equation (1) the packing fraction of the etched fiber termination is about 0.81 whereas the packing fraction of the termination would have been about 0.40 had the fibers not been etched.

Figure 3:
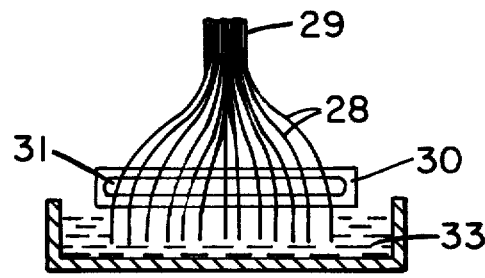
FIG. 3 is a schematic illustration of an apparatus for removing cladding from the end portions of a bundle of fibers.

The etching solution does not have to be agitated if the fibers of the bundle are separated prior to immersion in the etching solution. One method of separating the fibers is illustrated in FIG. 3 wherein individual fibers 28 of a bundle 29 are spread out over the surface of a glass slide 30, the surface of which is coated with a layer 31 of wax. The fiber ends are then immersed in etching solution 33 and permitted to etch without any agitation for a period of time sufficient to remove the desired amount of cladding. Very uniform etch rates have been obtained by this procedure.

Figure 4:
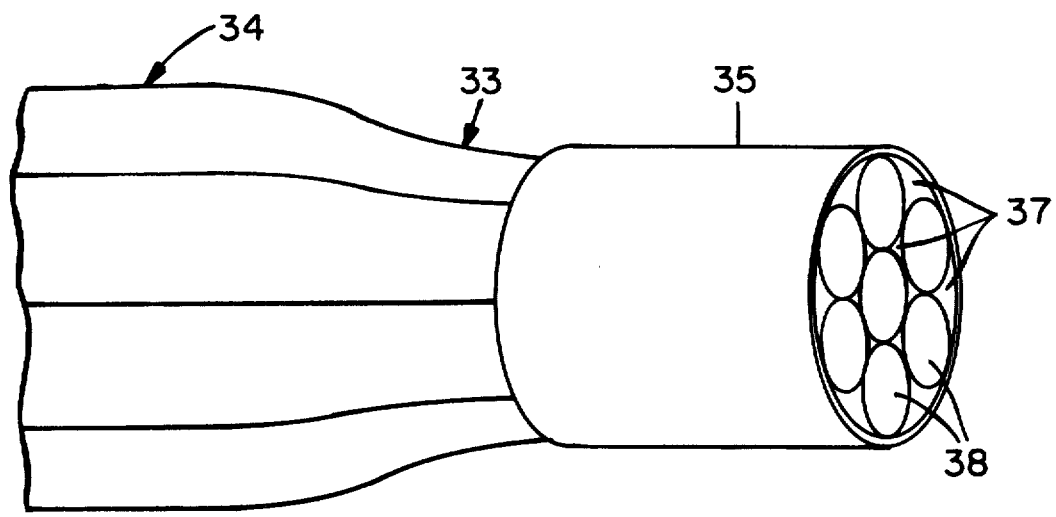
FIG. 4 is an oblique view of a bundle termination constructed in accordance with the present invention.

A fiber termination formed in accordance with the present invention is illustrated in FIG. 4 wherein etched fiber end portions 33 of fiber optic bundle 34 are disposed in terminating ferrule 35. The spaces between etched end portions 33 and can be filled with an adhesive 37 which is preferably a transparent material having a refractive index less than that of the fiber core material so that the propagation of light through the end portions is nearly the same as through the fully clad fibers. In this embodiment the cladding layer is completely removed from the fiber end portions, and the fiber endfaces 38 consist solely of core material.

The adhesive may consist of any suitable transparent adhesive having a low refractive index. Such adhesives include silicone fluid, ethyl-cyanoacrylate, epoxy, methyl siloxane, or the like. Many suitable adhesives are described in a compilation distributed by National Technical Information Service entitled "Properties of Optically Transparent Adhesives" by W. H. Veazie, June, 1972, publication No. EPIC-IR-76 (Revised). Of the adhesives listed therein, the following are preferred: DC 20-057, DC 200, Eastman 910, Permabond 102, R-63-489, RTV 602, RTV 615, Sylgard 51, Sylgard 182 and Sylgard 184.

Figure 5:
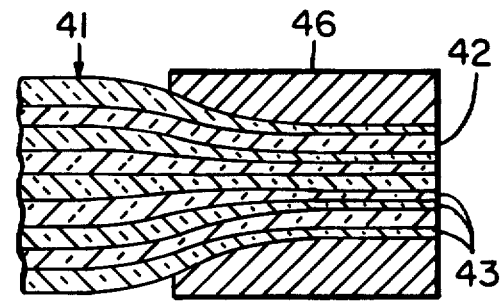
FIG. 5 is a cross-sectional view of one embodiment of the present invention.

Under certain circumstances it is advantageous to retain some minimum thickness of cladding material on the fiber end portions. The transparent cladding material is usually less absorptive and therefore provides a better light reflecting interface than the adhesive. If the cladding layer is either entirely removed or substantially removed from the core, then the adhesive begins to function as a cladding layer for the fiber core, and absorption losses can occur in the adhesive. The term "substantially removed" means that the cladding thickness is so negligible that much of the evanescent energy which propagates outside of the core is propagating beyond the thin cladding layer. Moreover, the adhesive may have a refractive index greater than that of the fiber core material. If the cladding layer is at least substantially removed and the refractive index of the adhesive is greater than that of the core material, light in the cores of the etched fiber end portions is extracted from the cores, and much of it is absorbed by the adhesive and thus does not contribute to the optical energy passing to or from the bundle. FIG. 5 shows a bundle termination wherein the cladding of fibers 41 is not completely removed. The packing fraction of termination endface 42 is not as great as it would be if the cladding were completely removed since cladding layers 43 contribute to the endface area. However, it can be seen that each of the fibers 41 has a thin layer of original cladding material which causes light to be efficiently propagated through the portion of the bundle within ferrule 46. This view illustrates the fact that the core diameter remains unchanged throughout the fiber length. This figure also illustrates a tapered ferrule which facilitates the insertion of the bundle therein.

Figure 6:
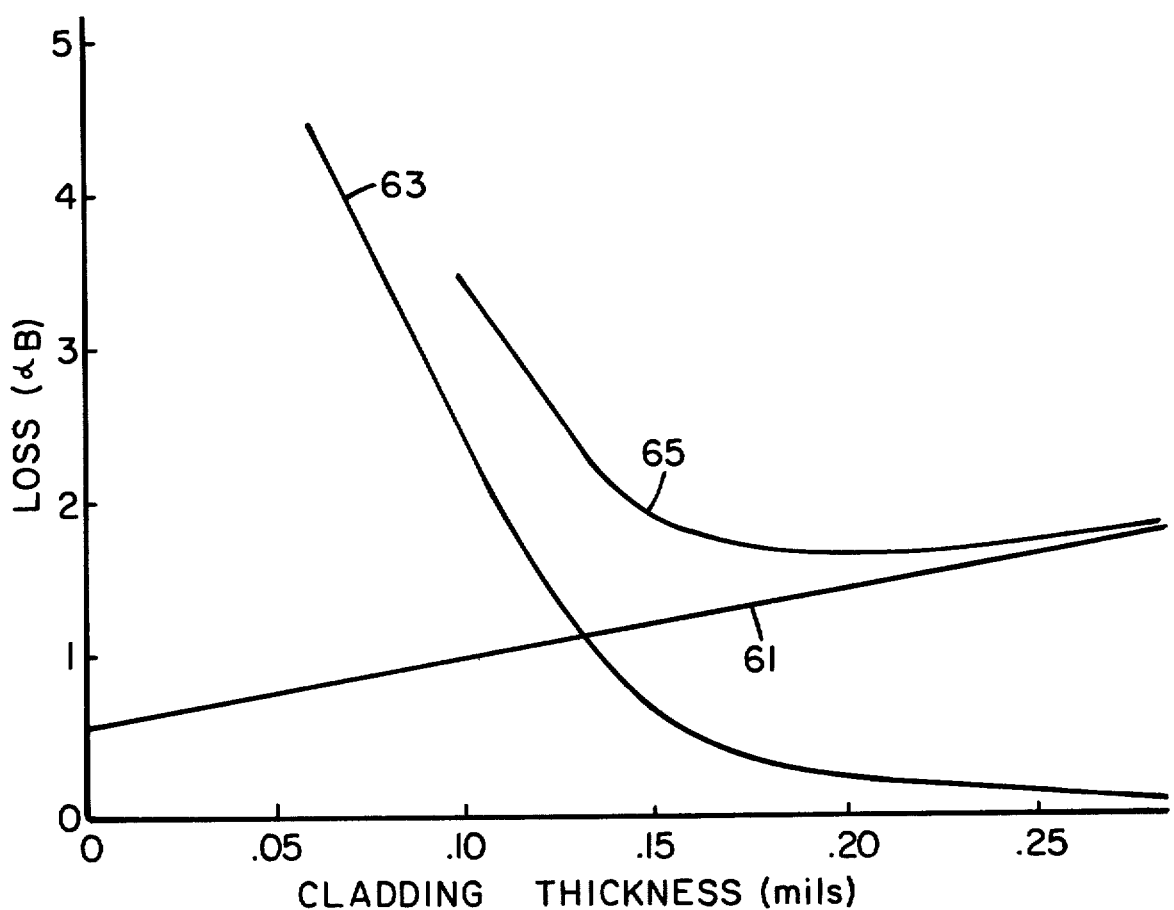
FIG. 6 is a graph illustrating various losses plotted as a function of cladding thickness.

FIG. 6 illustrates the advantage of retaining a thin layer of cladding if the refractive index of the cores of the optical fibers is lower than that of the bonding material. The curves of this figure are for a bundle of 61 fibers having a core diameter of 3.6 mils and an initial cladding thickness of 1.7 mils. The fiber cores consist of fused silica doped with germania and the cladding layer is pure fused silica. Curve 61 illustrates the change in packing fraction loss with respect to cladding thickness. As the cladding thickness decreases, the packing fraction increases, and the packing fraction loss decreases. However, if the adhesive employed to pot the fiber end portions in the ferrule has a refractive index greater than that of the fiber cores, the immersion loss, which is plotted as a function of cladding thickness in curve 63, sharply increases as the cladding thickness decreases below about 2 mils. The immersion loss is due to the extraction of energy from the cladding due to the relatively high refractive index of the bonding material. The sum of the immersion and packing fraction losses is plotted as curve 65. A minimum total loss of about 1.65 dB occurred at a cladding thickness of about 0.2 mils, and the total loss remained relatively low, i.e., below 1.75 dB for cladding thicknesses between about 0.17 and 0.25 mils.

Although the termination ferrule has been illustrated in the figures as being circular in cross-section, it may have other cross-sectional shapes such as hexagonal, square, triangular, rectangular or the like. Also, the present invention is applicable to fibers having non-circular cross-sections such as square, rectangular, triangular and the like. A particularly interesting case arises when square or rectangularly shaped fibers are placed in a square or rectangular ferrule. The packing fraction of this termination approaches unity as the cladding thickness is reduced to zero.

The present invention has been heretofore described as it applies to bundles of circular optical fibers having a single cladding layer. Some conventional fibers of this type are disclosed in U.S. Pat. Nos. 2,980,957 and 3,227,032 issued to J. W. Hicks, Jr. and L. O. Upton, respectively. As pointed out in the Upton patent, energy is transmitted through this type of fiber by repeated reflections from the core-cladding interface. The refractive index difference between the core and cladding of such conventional optical fibers is relatively large, and the cladding thickness is usually only about one-tenth the overall thickness of the fiber. Optical waveguides differ from conventional optical fibers in that light is transmitted therethrough by waveguide mode propagation. The difference between the refractive indices of the core and cladding of optical waveguide fibers is usually small and ratio of the total fiber diameter to the core diameter is between about 10:1 and 300:1 for single mode optical waveguides and between about 1001:1000 and 10:1 for multimode optical waveguides. Due to the mechanism by which energy is propagated in optical waveguides some portion of the light energy may be propagated at the outer part of the cladding, but most of the energy is propagated in and around the core. Methods of making optical waveguides having a core of transparent material surrounded by a single cladding layer are disclosed in U.S. Pat. Nos. 3,659,915 and 3,737,292 issued to R. D. Maurer et al. and D. B. Keck et al., respectively.

Figures 7, 8, 9:
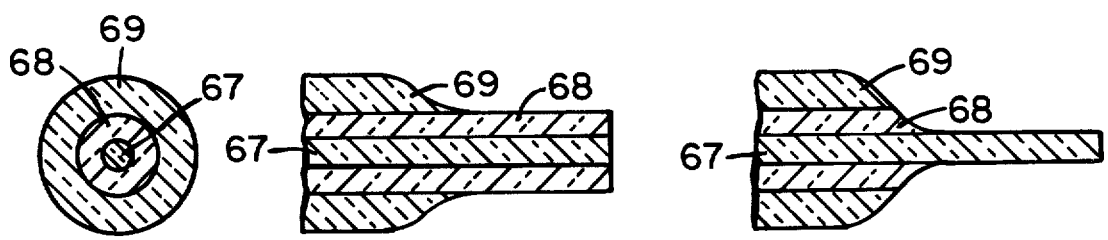
FIG. 7 is a cross-sectional view of a fiber having two cladding layers.
FIGS. 8 and 9 are cross-sectional views illustrating two different ways of terminating the fiber of FIG. 7.

FIG. 7 illustrates an optical waveguide wherein more than one cladding layer is employed. Core 67 is surrounded by first cladding layer 68 on which second cladding layer 69 is disposed. A waveguide of this type is disclosed in U.S. Pat. No. 3,737,293 issued to R. D. Maurer, wherein a 4 $\mu$m diameter core has a 40 $\mu$m diameter first cladding layer disposed on the surfaces thereof. To provide the waveguide fiber with mechanical strength, another cladding layer having a 150 $\mu$m diameter is disposed upon the surface of the first cladding layer. To increase the packing fraction of a bundle of fibers of this type, the outer cladding layer 69 could be removed as illustrated in FIG. 8. To obtain the maximum gain in packing fraction, both cladding layers 68 and 69 could be removed from the fiber end portions as illustrated in FIG. 9. Depending upon the desired increase in packing fraction, which may in turn depend upon the refractive indices of the fiber core and the adhesive, it may be advantageous to retain some minimum thickness of layer 68 or even all of layer 68 and some of layer 69.

In some optical waveguides the cladding does not exist as a distinct layer, the optical characteristics of which differ markedly from those of the core or adjacent layer. U.S. Pat. No. 3,647,406 issued to G. M. C. Fisher, discloses an optical waveguide wherein the refractive index gradually decreases from a relatively high value at the core to a lower value at the fiber surface. Such a fiber can be formed by an ion exchange process. U.S. Pat. Nos. 3,614,197 and 3,658,407 issued to Nishizawa et al. and Kitano et al., respectively, also disclose optical waveguides having a gradient refractive index.

For purposes of this invention, the core of a fiber having a gradient refractive index is the central part of the fiber wherein the greatest portion of the propagating optical energy is concentrated. The cladding of such a fiber is the outer portion surrounding the core and extending to the fiber surface. Removal of all or part of this outer portion or cladding layer, wherein only a small portion of energy propagates, does not cause significant losses but can significantly increase the termination packing fraction.

I claim:

1. In an optical communication system of the type comprising
    a plurality of optical fibers disposed in side-by-side bundled relationship, each of said fibers including a relatively long light transmitting portion and at least one relatively short end portion, said relatively short end portions of said fibers terminating in a bundle endface, each of said fibers having a core of transparent material surrounded by a layer of transparent cladding material having a refractive index less than that of said core material,
    means disposed at one end of said plurality of fibers for retaining said relatively short end portions, and
    means disposed adjacent to said one end of said plurality of fibers for directing a beam of light onto said bundle endface and initiating propagation of the same optical signal in each fiber,
said fibers being characterized in that the thickness of said cladding material at the end portion of each of said fibers is less than the thickness of said cladding material at the light transmitting portion thereof, the core diameter of the end portion of each fiber being substantially the same as that of the light transmitting portion thereof.

2. An optical communication system in accordance with claim 1 wherein said end portions contain no cladding material.

3. An optical communication system in accordance with claim 2 further comprising adhesive material disposed between said fiber end portions, the refractive index of said adhesive material being less than that of said core material.

4. An optical communication system in accordance with claim 1 wherein the thickness of cladding layer of said end portions is between 0.16 and 0.25 mils.

5. An optical communication system in accordance with claim 4 further comprising adhesive material disposed between said fiber end portions, the refractive index of said adhesive material being greater than that of said cores.

6. An optical communication system in accordance with claim 1 further comprising a termination ferrule in which said end portions are disposed, an end of said ferrule and the ends of said fibers being disposed in a single plane.

7. A fiber optic bundle comprising
    a plurality of optical fibers disposed in side-by-side bundled relationship, each of said fibers including a relatively long light transmitting portion and at least one relatively short end portion, each of said fibers consisting of a core of transparent material surrounded by a single layer of transparent cladding material having a refractive index less than that of said core material, the thickness of said cladding material at the end portion of each of said fibers being less than the thickness of said cladding material at the light transmitting portion thereof, the core diameter of the end portion of each fiber being substantially the same as that of the light transmitting portion thereof.

8. A fiber optic bundle in accordance with claim 7 wherein the light transmitting portion of said fibers is flexible.

9. A fiber optic bundle in accordance with claim 7 wherein the thickness of the cladding layer of said end portions is between 0.16 and 0.25 mils.

10. A light transmitting system comprising
    a plurality of optical fibers disposed in side-by-side bundled relationship, each of said fibers including a relatively long light transmitting portion and at least one relatively short end portion, said relatively short end portions terminating in a bundle endface, each of said fibers having a core of transparent material surrounded by a layer of transparent cladding material having a refractive index less than that of said core material, the thickness of said cladding material at the end portion of each of said fibers being less than the thickness of said cladding material at the light transmitting portion thereof, and the core diameter of the end portion of each fiber being substantially the same as that of the light transmitting portion thereof,
    means disposed at one end of said plurality of fibers for retaining said relatively short end portions, and
    means disposed adjacent to said one end of said plurality of fibers for directing a beam of light onto said bundle endface, thereby initiating the propagation of the same optical signal in each of said fibers.

11. A light transmitting system in accordance with claim 10 wherein said end portions contain substantially no cladding material.

12. A light transmitting system in accordance with claim 10 wherein the thickness of the cladding layer of said end portions is between 0.16 and 0.25 mils.

13. An optical communication system in accordance with claim 1 wherein said layer of transparent cladding material consists of a single layer of cladding material.

14. An optical communication system in accordance with claim 10 wherein said layer of transparent cladding material consists of a single layer of cladding material.

* * * * *